United States Patent
Jones

(10) Patent No.: US 9,275,481 B2
(45) Date of Patent: Mar. 1, 2016

(54) VIEWPORT-BASED CONTRAST ADJUSTMENT FOR MAP FEATURES

(71) Applicant: GOOGLE INC., Mountain View, CA (US)

(72) Inventor: Jonah Jones, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 126 days.

(21) Appl. No.: 14/182,977

(22) Filed: Feb. 18, 2014

(65) Prior Publication Data

US 2015/0235390 A1    Aug. 20, 2015

(51) Int. Cl.
*G06T 11/20* (2006.01)
*G01C 21/32* (2006.01)

(52) U.S. Cl.
CPC ............ *G06T 11/20* (2013.01); *G01C 21/32* (2013.01); *G06T 11/206* (2013.01)

(58) Field of Classification Search
CPC ..... G06T 15/04; G06T 15/205; G06T 7/2033; G06T 7/0022; G06T 17/05; G06K 9/00791; G01C 21/3614; G01C 21/3682
See application file for complete search history.

(56) References Cited

U.S. PATENT DOCUMENTS

| | | | |
|---|---|---|---|
| 8,350,873 B2 | 1/2013 | Sakashita | |
| 2009/0092277 A1* | 4/2009 | Ofek | G06K 9/3233 382/100 |
| 2013/0035853 A1* | 2/2013 | Stout | G06T 17/05 701/438 |
| 2015/0130845 A1* | 5/2015 | Otero | G06K 9/00476 345/661 |

OTHER PUBLICATIONS

ArcGIS Resources, "Displaying a Subset of Features in a Layer," (1995-2012). Retrieved from the Internet at: URL:http://resources.aragis.com/en/help/main/10.1/index.html#//00s50000002z000000.
Yelp, "Best Tacis in New York, NY," (2015). Retrieved from the Internet at: URL:http://www.yelp.com/search?find_desc=tacos&find_loc=New+York%2C+NY&ns=1.

* cited by examiner

*Primary Examiner* — Todd Buttram
(74) *Attorney, Agent, or Firm* — Marshall, Gerstein & Borun LLP

(57) ABSTRACT

A system receives a description of a first set of elements representing physical and/or logical entities in a geographic area to be displayed on a digital map. The system determines current boundaries of a viewport within which the digital map is to be displayed and generates a metric indicative of how frequently the elements in the first set occur within the current boundaries of the viewport relative to at least a second set of elements displayed on the digital map. The system determines one or more visual attributes for the first set of elements based at least in part on the generated metric and displays representations of the first set of elements on the digital map in accordance with the determined one or more visual attributes.

20 Claims, 4 Drawing Sheets

VIEWPORT-BASED CONTRAST ADJUSTMENT FOR MAP FEATURES

FIELD OF THE DISCLOSURE

This disclosure generally relates to interactive digital maps and, more particularly, to visualization of individual elements displayed on digital maps.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, numerous user devices can display interactive digital maps. Typically, the same contrast level is used to display feature of a similar type, such as walking paths or railroad lines. Similarly, location markers for search results typically are displayed as identical dots or other shapes. A single dot can be easily "lost" on a display among other map features, so that the user cannot immediately see the dot. On the other hand, a large number of dots create clutter and similarly make it difficult for the user to quickly identify the desired location.

SUMMARY

A dynamic feature visualization engine determines how frequently elements of a certain type appear in the current viewport relative to other elements of the digital map. For example, a mapping module displays a small number of elements with high prominence, a larger number of elements with medium prominence, and the remaining elements with low prominence. For example, if a search returns 21 elements, the top three may be displayed with high prominence, the next six may be displayed with medium prominence, and the remaining 12 elements may be displayed with low prominence. Afterwards, a mapping module may adjust the position of the viewport (response to user input or another signal), thereby changing the number of elements displayed within the viewport. The dynamic feature visualization engine then can re-calculate the prominence levels of the elements and adjust the contrast between these elements and the surrounding scene (e.g., to confirm with the 3/6/n prominence scheme again).

In one embodiment, a method for generating interactive digital maps includes receiving a description of a first set of elements representing physical and/or logical entities in a geographic area to be displayed on a digital map. The method further includes determining current boundaries of a viewport within which the digital map is to be displayed and generating a metric indicative of how frequently the elements in the first set occur within the current boundaries of the viewport relative to at least a second set of elements displayed on the digital map. Still further, the method includes determining one or more visual attributes for the first set of elements based at least in part on the generated metric and displaying representations of the first set of elements on the digital map in accordance with the determined one or more visual attributes. These steps or acts can be executed on one or more processors, for example.

In another embodiment, a computing device includes a user interface and processing hardware coupled to the user interface. The processing hardware is configured to receive map data for rendering a digital map to be displayed via the user interface within a viewport, where the map data includes indications of a plurality of elements including several elements of a common type. The processing hardware is further configured to generate a metric indicative of how frequently the elements of the common type occur within the viewport relative to at least some of the other ones of the plurality of elements, generate a set of visual attributes for the elements of the common type based at least in part on the generated metric, and render the digital map with representations of the elements of the common type rendered in accordance with the determined set of visual attributes.

In yet another embodiment, a method in a computing device for generating interactive digital maps includes receiving a description of a plurality of elements representing physical and/or logical entities in a geographic area, where a representation of each of the plurality of elements is to be displayed in a respective position on a digital map. The method further includes displaying a first portion of the digital map within a first viewport; displaying representations of a first subset of the elements within the first viewport, including selecting one or more visual attributes for the first subset in view of a size of the first subset; displaying a second portion of the digital map within a second viewport; and displaying representations a second subset of the elements within a second viewport, including applying one or more different visual attributes for the second subset in view of a size of the second subset, where the first subset and the second subset partially overlap.

DETAILED DESCRIPTION

Overview

To more clearly convey information on a digital map, a system of this disclosure determines how frequently elements of a certain type appear in the current viewport relative to other elements of the digital map, and, when necessary, updates visual attributes of these elements to emphasize or de-emphasize contrast with the rest of the digital map. When the viewport is repositioned, the system dynamically recalculates the density of the elements of the certain type and sometimes adjusts the visual attributes in view of the new density. In this manner, elements representing physical or logical entities that should be prominent for a given viewport are visually emphasized, while elements representing physical or logical entities that are relatively common or otherwise non-prominent are visually de-emphasized.

When assessing the density of certain elements on a digital map, the system can compare these elements to generally similar elements or to elements of other types. Thus, for example, location markers corresponding to certain places can be compared to similar location markers or to generally dissimilar elements such as representations of buildings, parks, etc. More generally, the system can assess the relatively scarcity or abundance of graphics within a viewport according to any suitable principle.

In one example scenario, the system displays location markers for various search results on a digital map. When a relatively large number of location markers are within a certain viewport, the system displays location markers for top N results in first manner, location markers for the next M results in a different manner, location markers for the next L results in yet another manner, etc. In this manner, the user sees less clutter and more readily recognizes relevant search results. When the viewport moves as a result of a pan and/or zoom operation, some of the markers previously included in the viewport can be left out, and new markers can "enter" the viewport. The system accordingly can identify the new top N results, the next M results, etc. and re-assess the visual attributes of some or all of the markers.

In another example scenario, the system displays paths of a certain type in the viewport, in a certain visual style. When the viewport moves, some of the paths still visible in the new viewport become less frequent relative to other paths, buildings, bodies of water, and other geographic features. Accordingly, the system may make these paths more prominent within the new viewport by increasing line thickness or applying a brighter color, for example.

These techniques are discussed in more detail below with reference to FIGS. 1-4. In these example, the system is implemented in a client device. However, in general similar techniques can be implemented on a server device, or partially implemented on a client device, and partially implemented on a server device.

Example Systems and Methods

Figure 1:
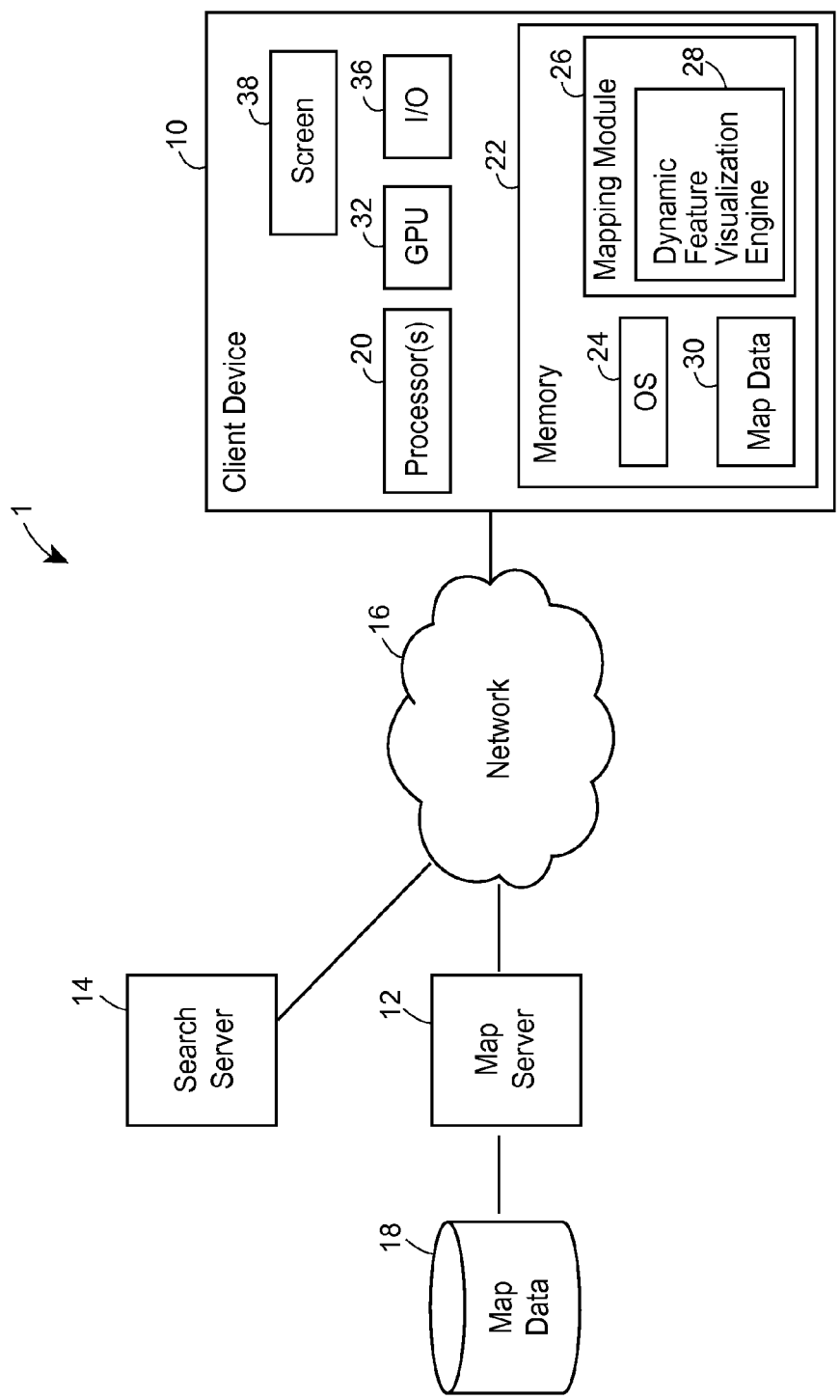
FIG. 1 is a block diagram of an example system computing system in which the techniques for dynamically adjusting contrast between elements on a digital map can be implemented.

FIG. 1 depicts an example system 1 in which the contrast level for map elements is adjusted depending on the viewport of a client device 10. Depending on the implementation, the client device 10 can be, for example, a smartphone, a tablet computer, or a desktop computer. The client device 10 is communicatively coupled to a map server 12 and a search server 14 via a communication network 16, which can be any suitable local- or wide-area network including the Internet. The map server 12 is also coupled to a map database 18. In operation, the map server 12 can receive a request for map data, access the map database 18 and/or search server 14 and provide map data to the portable user device 10.

An example client device 10 includes one or more processors 20 coupled to a memory 22. Each of the one or more processors 20 can be any suitable general-purpose processing unit (e.g., a CPU), a microprocessor, or an application-specific processing unit. The memory 22 can a non-transitory computer-readable medium that can include persistent components such as a hard disk, a flash drive, etc. and non-persistent components such as a random access memory (RAM) unit. The processor(s) 20 and the memory 22 can be interconnected via a suitable electrical connection such as a digital bus, for example. The memory 22 can store instructions that implement an operating system (OS) 24 as well as instructions that implement various applications, services, drivers, etc. (not shown).

The memory 22 also stores a mapping module 26 with instructions executable on the one or more processors(s) 20, for example. In various embodiments, the mapping module 26 is implemented as an independent application, an extension of another application such as a web browser, as a script interpreted by a web browser or another application, etc. The memory 22 also can store various parameters of the mapping module 26 as well as data used by other software components, such as map data 30. The mapping module 26 includes a dynamic feature visualization engine 28 that accesses map data 32 and adjusts the contrast level of one or more elements depending on the viewport of the client device 10. As discussed below, the engine 28 can determine the current boundary of the viewport, which the user positions using pan and zoom operations, for example, and determines how frequently elements of a certain type appear within the viewport. In an example implementation, the client device 10 further includes a graphics processing unit 32 to efficiently render graphics content such as interactive digital maps, for example.

The client device 10 also can include one or more input/output devices 36 configured to receive user input and provide output to a user. The client device 10 can include a visual interface such as a screen 38, a screen external to the client device 10, or any other component or a set of components for generating a visual presentation of data. In some implementations, the screen 38 is a touchscreen configured to both provide output and receive input. More generally, the client device 10 can include any suitable input and output devices in addition to, or instead of, those illustrated in FIG. 1.

Example operation of the dynamic feature visualization engine 28 to adjust the contrast of one or more elements depending on the current viewport is discussed next with reference to FIGS. 2 and 3. An example method which the dynamic feature visualization engine 28 can implement is then discussed with reference to FIG. 4.

Figure 2:
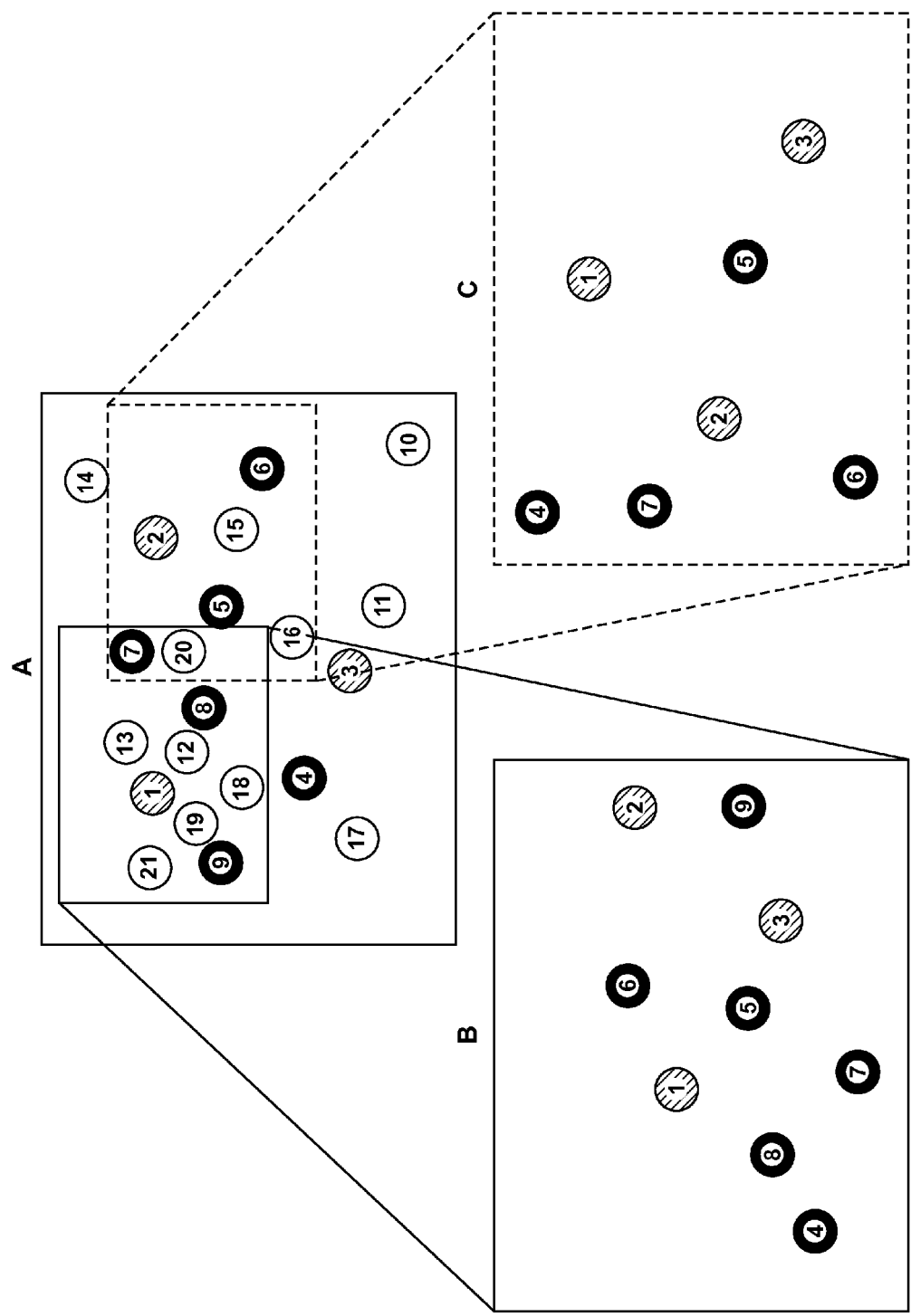
FIG. 2 is a diagram illustrating location markers corresponding to ranked search results, to which the visualization techniques of this disclosure were applied to dynamically create contrast between sub-sets of location markers in several viewports.

FIG. 2 illustrates example viewports A, B, and C that can be displayed on the client device 10 illustrated in FIG. 1 or example suitable device. As used herein, the term viewport refers to the visible portion of the digital map displayed on the display of the client device. In general, the boundaries of a viewport are set by user operations such as pan, zoom, etc. Although the viewports A-C are rectangular, the viewport in general can have any suitable shape. The dynamic feature visualization engine 28 displays multiple elements within the viewport. As will be explained in further detail below, the dynamic feature visualization engine 28 determines the visual attributes of the elements to emphasize or de-emphasize contrast with the rest of the digital map, and may adjust the visual attributes of the elements when the viewport is repositioned.

Generally speaking, the term "element," as used herein, can refer to any physical and/or logical entities in a geographical area displayed on a digital map. For example, an element may be a search result, which is visually represented on a digital map using a location marker such a dot, a circle, etc. Physical entities may include structures, such as a buildings, roads, bridges, walking paths, as well as natural entities such as rivers, trees, etc. Such elements correspond to map features on a digital map, and can be represented on a digital map using appropriate shapes, labels, bitmap images, etc.

As a more specific example, the map server 12 can provide map features to the client device 10 as part of map data for rendering a digital map. The geometry of each map feature can be described in a vector graphics format or a similar format, to make each map feature scalable and easily re-drawable. The map data can further specify a default set of visual attributes for a feature, such as line thickness, color, transparency level, etc. A set of such visual attributes can be referred to as "rendering style." In addition to describing geometry for map features, the map data can specify labels, metadata such as indications of indoor content, boundaries of administrative units, etc.

In some cases, the map server 12 organizes map data into tiles, or portions of a map covering equal geographic areas at a certain zoom level. The tiles may be square to simplify management on the client device 10. Thus, a viewport at a certain zoom level can cover 20 tiles, and at another zoom the viewport can cover 80 tiles.

As applied to paths, the term "map element" or simply "element" in this disclosure may refer a segment of a path. In some cases, the segment is of a certain approximate length. For example, a highway may traverse the entire width of a viewport and appear as a single continuous polyline. However, to more accurately assess how often the highway occurs in the viewport relative to other roads, paths, and/or other geographic features, the dynamic feature visualization engine 28 can count the number of segments of the highway in the viewport.

As a more specific example, the dynamic feature visualization engine 28 may determine that there are 12 highway segments and 145 other map features within the current viewport. Using this information, the dynamic feature visualization engine 28 can now calculate the ratio of highway segments to other features (i.e., 12/145) to generate a numerical metric of how frequently the highway segments occur in the viewport.

In some implementations, the numerical metric indicates whether the number of elements of a similar type fits a certain distribution scheme. For example, X search results occurring in a viewport can be distributed first into a first tier or group of up to N elements. If X>N, the next M elements can be distributed into the next group of up to M elements, etc. The sizes of groups in this distribution scheme can depend on the total number of elements within the current boundaries, and can be adjusted accordingly. As one example, when the viewport is repositioned and now X' search results are visible in the viewport, the size of the medium-prominence group can be adjusted to M'.

More generally, the numerical metric can be generated according to any suitable scheme to generate an indication of how often an element of a certain type occurs in a used to indicate how frequently the elements in one set occur within the current boundaries of the viewport relative to at least one additional set of elements occur with the current boundaries of the viewport. The numerical metric can be expressed a percentage, a specific value, a ratio, a density, etc. The dynamic feature visualization engine 28 can compare the numerical metric to one or several threshold values to determine whether new visual attributes should be used.

With continued reference to FIG. 2, the mapping module 26 can receive a description of 21 search results, each of which corresponds to respective location a digital map. To indicate these locations on the map, the dynamic feature visualization engine 28 first can determine the current boundaries of a viewport within which the digital map is to be displayed. In the illustrated example, the dynamic feature visualization engine 28 divides the 21 search results into three non-overlapping sets: the first set including search results 1-3, the second set including search results 4-9, and the third set including results 10-21. Association of markers with sets is illustrated in FIG. 2 using different fill patterns. The first set corresponds to a high level of prominence, the second set corresponds to a medium level of prominence, and the third set corresponds to a low level of prominence.

It is noted that visual attributes in general can include one or more of color, line pattern, line thickness, shading, contrast level, sharpness, size, etc. Thus, in some embodiments, the dynamic feature visualization engine 28 can make certain elements more prominent by enlarging their shapes. In another embodiment, the dynamic feature visualization engine 28 make certain elements less prominent by blurring. In yet another embodiment, the dynamic feature visualization engine 28 can display prominent elements using a full color scheme, and display non-prominent elements in grayscale.

When a digital map includes polygons filled with a certain color, the dynamic feature visualization engine 28 in some implementations can adjust the fill color of a polygon depending on how much of the viewport the polygon occupies. For example, a polygon that represents a park can have green as the default color. The dynamic feature visualization engine 28 can make the fill color bright green when this polygon (or a portion of the polygon) occupies approximately 10% of the viewport, and make the color pale green if the polygon occupies about 100% of the screen. In this implementation, the dynamic feature visualization engine 28 can measure the size of the polygon relative to the aggregate size of other map elements in the viewport (or, in another implementation, the total area covered by the viewport). Thus, even though there may be only one instance of a polygon in the viewport, the dynamic feature visualization engine 28 can identify situations when the polygon effectively "dominates" the viewport.

In this implementation, the dynamic feature visualization engine 28 can generate a metric indicative of how frequently portions of a certain map element, rather than the entire map element, occur relative to other map elements. This approach is generally similar to counting path segments of a certain length discussed above. In the case of polygons, the dynamic feature visualization engine 28 can count the number of pixels occurring with a shape, for example, or calculate the approximate number of cells of a fixed size covered by a polygon.

Still referring to FIG. 2, the user input can cause viewport A to be reposition to become viewport B. For example, the user input can cause the map to zoom in to a certain area, zoom out to a wider area, move to a second area, etc. Accordingly, the dynamic feature visualization engine 28 can receive an indication that the viewport has been repositioned. In response to this indication, the dynamic feature visualization engine 28 can determine new boundaries of the viewport, determine the number of elements within the new boundaries of the viewport, distribute or group the elements into one or more non-overlapping sets and determine one or more new visual attributes for the first set of elements based, at least, in part of the new metric.

In the illustrated example, ten elements of the 21 elements displayed within viewport A are to be displayed within the boundaries of new viewport B. Accordingly, the dynamic feature visualization engine 28 creates three sets of elements and to determine a visual attribute for each of the three sets of elements. In this viewport, the markers representing the elements are re-numbered to form a new continuum indicating new ranking within the new viewport. For example, element 20 in viewport A (corresponding to low prominence) is "promoted" and now becomes element 9 in viewport B (corresponding to medium prominence). As a result, viewport B includes a high-prominence set including newly ranked elements 1-3, a medium-prominence set made up of elements 4-9, and a low-prominence set including element 10.

Similarly, seven elements of the 21 elements of viewport A are to be displayed with the boundaries of viewport C. In this embodiment, the dynamic feature visualization engine 28 distributes the seven elements into only two groups. The dynamic feature visualization engine 28 further determines a visual attribute for each of the two sets of elements. The high-prominence set (newly ranked elements 1-3) is represented by the visual attribute of a solid circle, and the remaining set (newly ranked elements 4-7) is represented by the visual attribute of a blackened circle. The dynamic feature visualization engine 28 then displays representations of the two sets of elements on the digital map in accordance with determined visual attributes.

Figure 3:
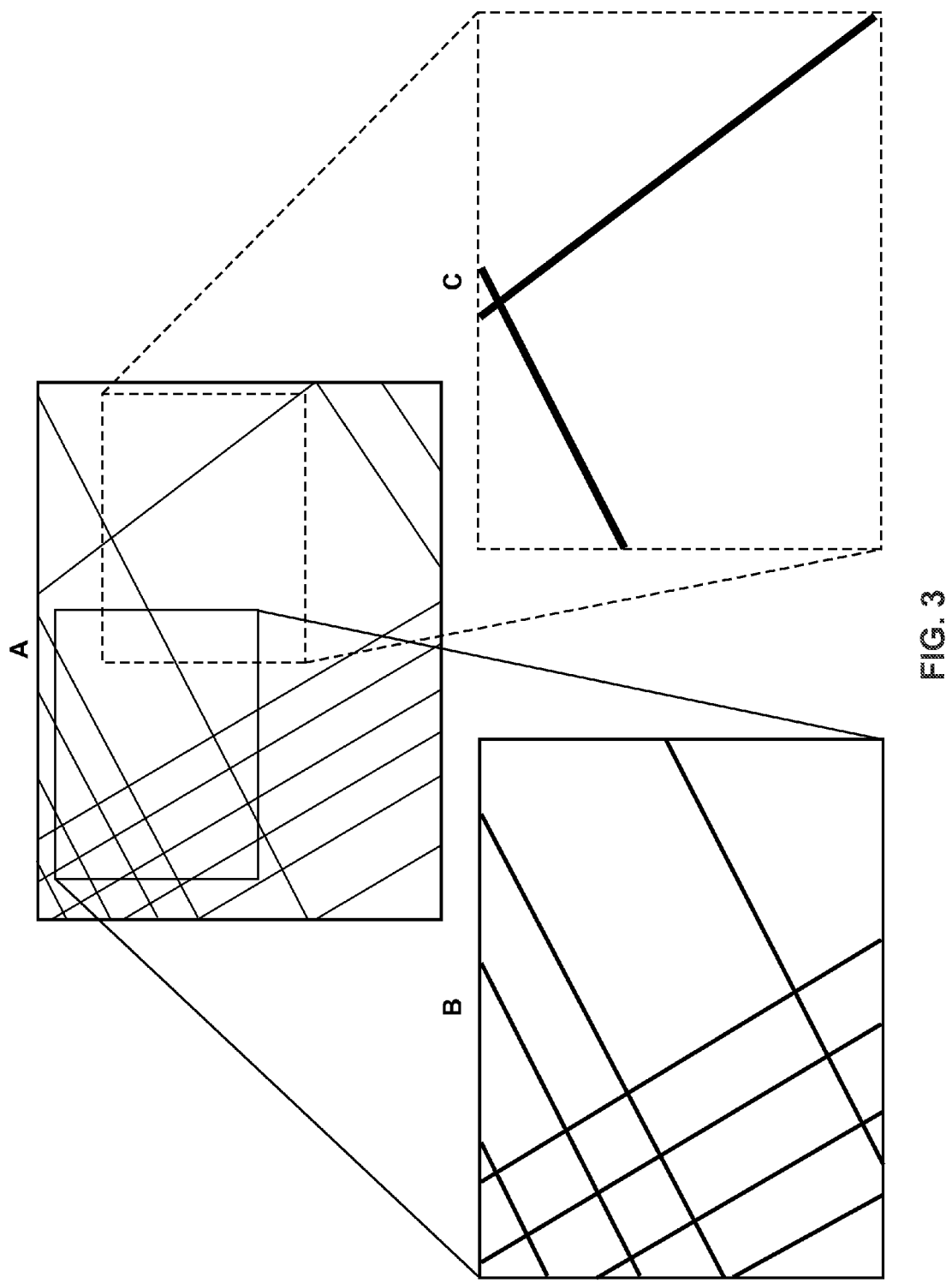
FIG. 3 is a diagram illustrating path segments on an example digital map, to which the visualization techniques of this disclosure were applied to dynamically create contrast between sub-sets of paths in several viewports.

FIG. 3 schematically illustrates another set of example viewports A-C, where the dynamic feature visualization engine 28 determines one or more visual attributes for a set of elements depending on the appearance frequency of the set of elements relative to the appearance frequency of one or more additional sets of elements. In this example, the elements correspond to paths on a digital map. Similar techniques can be applied to other elements corresponding to geographic feature such as buildings, parks, bodies of water, etc.

In some cases, one or more elements representing geographic features to be displayed within a viewport of a digital map have a higher or lower relevance to the user depending on the frequency of appearance of the element relative to the frequency of appearance one or more other type of element. For example, due to the relatively large number of various elements displayed in a viewport covering a portion of a city, walking paths are probably of little interest to the user, and can be considered to be relatively irrelevant. Accordingly, in this context, the dynamic feature visualization engine 28 can determine visual attribute(s) for walking paths in so as to cause the walking paths to be displayed with low visual prominence. The dynamic feature visualization engine 28 thereby reduces clutter. It is noted that the dynamic feature visualization engine 28 in some cases may override the default visual attributes defined for the walking paths.

On the other hand, if map context is a national park, however, walking paths can be considered a highly prominent feature due to the overall scarcity of features. For example, a small number of shapes with a green fill pattern can represent large wooded areas. Accordingly, the dynamic feature visualization engine 28 can display the walking paths at a higher contrast level. Referring again to FIG. 3, there is a high number of footpaths displayed within the boundaries of viewport A. Accordingly, the dynamic feature visualization engine 28 renders the footpaths with low visual prominence, as represented by a thin line. However, when viewport A is repositioned to become viewport B, a smaller number of footpaths end up within the new viewport boundaries. The dynamic feature visualization engine 28 accordingly renders the footpaths with medium visual prominence depicted by relatively thick lines in viewport B. Further, when the viewport is repositioned to become viewport C, there are only two footpaths remaining in the viewport, and the dynamic feature visualization engine 28 renders the footpaths with high prominence using bold lines. It will be noted that, in some cases, path segments common to viewports B and C are rendered differently in different viewports even when the zoom level does not change, to avoid visual discontinuity within any given viewport.

In some embodiments, the contrast of all footpaths is adjusted depending on the overall density. In other embodiments, the contrast level is determined on a feature-by-feature basis, so that the contrast of footpaths does not impact the contrast of local and arterial roads, for example. Further, in some embodiments, the localized contrast is applied to all elements of the map including points of interest (POIs), elements with polygon fills (a bright green park occupying 10% of the screen would fade to a pale green when occupying 100% of the screen), etc.

Figure 4:
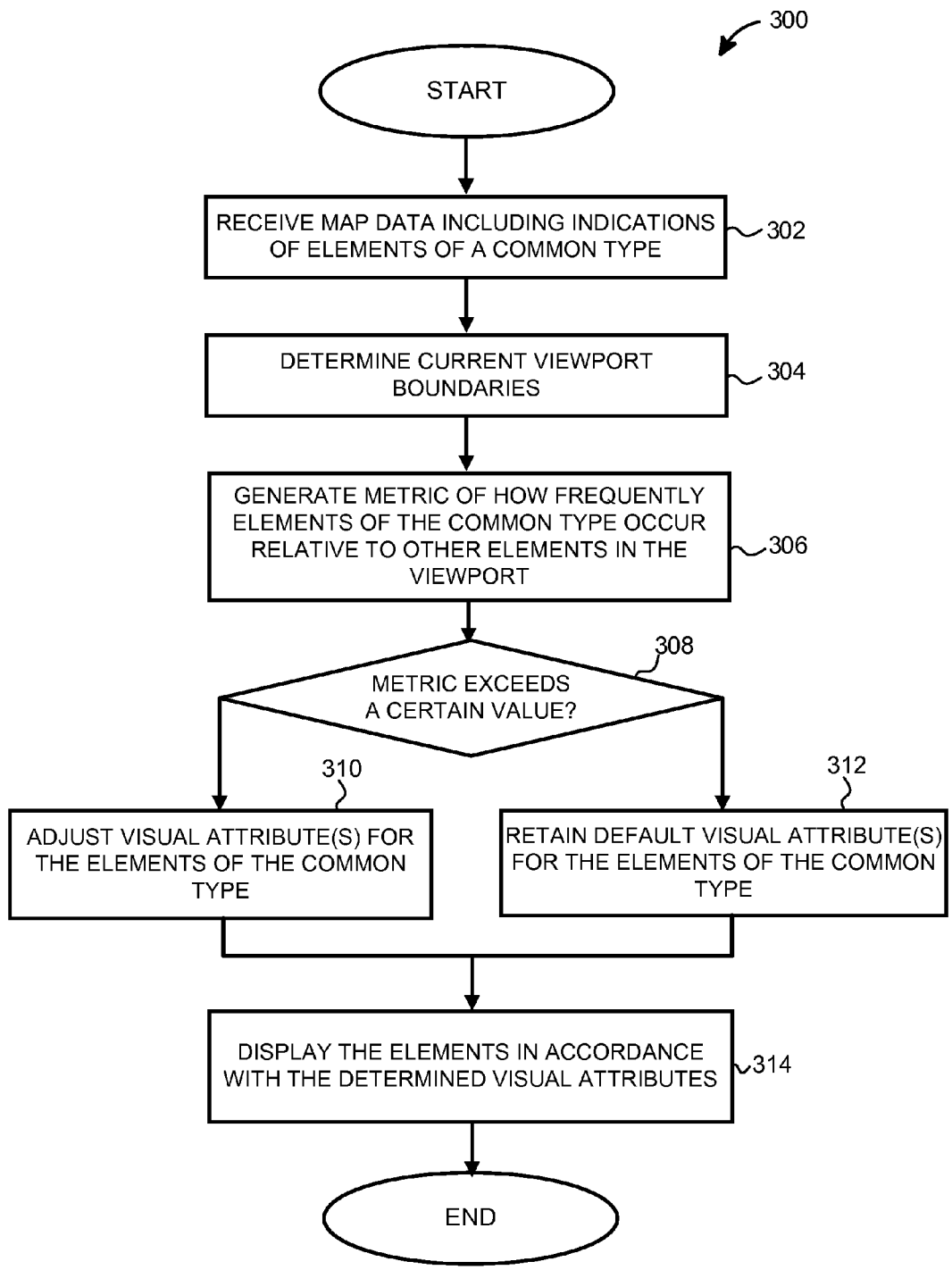
FIG. 4 is a flow diagram of an example method for generating an interactive digital map using the visualization techniques of this disclosure.

Now referring to FIG. 4, a method 300 can be executed in the dynamic feature visualization engine 28, for example. The method 300 can be implemented as a set of instructions in any suitable one or several programming languages, stored on a non-transitory computer-readable medium and executable on one or more processors, for example.

The method begins at block 302, where map data including indications of a common type is received. The common type can be, for example, path segments of a similar type. At block 304, current boundaries of the viewport are determined.

At block 306, a metric is generated to numerically indicate how frequently the elements of the common type occur within the viewport, relative to a set of other elements. As discussed above, the set of other elements can encompass all other elements in the viewport. Thus, for example, frequency of occurrence of bicycle paths in a viewport can be assessed based on the number of elements representing such geographic features as buildings, river segments, wooded areas, etc. In other implementations, the set of other elements is limited to elements of one or more particular types. Thus, for example, frequency of occurrence of bicycle paths in a viewport can be assessed based on the number of segments of walking paths, roads, highways, etc. in the viewport, while elements representing buildings and other geographic features are excluded from the analysis.

At block 308, the calculated metric is compared to a threshold value. For example, the ratio of segments of walking paths to the overall number of features or the overall number of path segments can be compared to a certain fraction (e.g., $\frac{1}{10}$, $\frac{1}{100}$). If the metric exceeds the threshold value, the flow proceeds to block 310, where visual attributes for these elements are adjusted to increase contrast (in other words, to add emphasis). Otherwise, if the metric does not exceed the threshold value, the flow proceeds to block 312, where the default visual attributes defined for these elements are applied. The elements are then displayed in accordance with the determined visual attributes at block 314.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for viewport-based contrast adjustment for map features through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating interactive digital maps, the method comprising:
receiving, by one or more processors, a description of a first set of elements representing physical and/or logical entities in a geographic area to be displayed on a digital map;
determining, by the one or more processors, current boundaries of a viewport within which the digital map is to be displayed;
generating, by the one or more processors, a metric indicative of how frequently the elements in the first set occur within the current boundaries of the viewport relative to at least a second set of elements displayed on the digital map;
determining, by the one or more processors, one or more visual attributes for the first set of elements based at least in part on the generated metric; and
displaying representations of the first set of elements on the digital map in accordance with the determined one or more visual attributes.

2. The method of claim 1, wherein the elements correspond to search results, the method further comprising:
receiving, by the or more processors, a description of a plurality of search results, each associated with a respective location within the geographic area;
grouping, by the one or more processors, the plurality of search results into a plurality of non-overlapping sets including the first set and the second set;
determining, by the one or more processors, one or more different visual attributes for each of the plurality of sets; and
displaying, for each of the search results, a respective location marker on the digital map, in accordance with the determined visual attributes, so that markers in a same set have same visual attributes, and markers in different sets have different visual attributes.

3. The method of claim 2, wherein the plurality of non-overlapping sets form a sequence, and wherein each set in the sequence has a larger number of elements that the preceding set.

4. The method of claim 1, wherein:
the elements in the first set represent paths of a first type, and
the elements in the set represent paths of a second type.

5. The method of claim 4, further comprising:
receiving, by the one or more processors, a description of one or more default visual attributes for paths of the first type;
in response to determining that the metric does not exceed a certain value, using the one or more default visual attributes as the one or more visual attributes for the first set of elements;
otherwise, in response to determining that the metric exceeds a certain value, selecting visual attributes, different from the one or more default visual attributes, as the one or more visual attributes for the first set of elements.

6. The method of claim 1, wherein:
the elements in the first set represent paths of a common type, and
the elements in the second set represent geographic features including one or more of buildings, bodies of water, and wooded areas.

7. The method of claim 1, wherein generating the metric includes:
determining, by the one or more processors, a ratio between an average density of the elements from the first set in the viewport to an average density of the elements from the second set in the viewport,
when the ratio is higher than a certain threshold, selecting the one or more visual attributes for the first set of elements so as to increase a visual contrast between the representations of the first set of elements and representations of the second set of elements.

8. The method of claim 1, further comprising:
receiving, by the one or more processors, an indication that the viewport has been repositioned in response to a user action;
in response to the indication:
determining new boundaries of the viewport,
generating a new metric indicative of how frequently the elements in the first set occur within the new boundaries of the viewport relative to at least the second set of elements,
determining one or more new visual attributes for the first set of elements based at least in part on the new metric, and
displaying representations of the first set of elements on the digital map in accordance with the new one or more visual attributes.

9. The method of claim 1, wherein determining the one or more visual attributes includes determining at least one of color and line thickness.

10. A computing device comprising:
a user interface;
processing hardware coupled to the user interface and configured to:

receive map data for rendering a digital map to be displayed via the user interface within a viewport, wherein the map data includes indications of a plurality of elements including several elements of a common type, generate a metric indicative of how frequently the elements of the common type occur within the viewport relative to at least some of the other ones of the plurality of elements, generate a set of visual attributes for the elements of the common type based at least in part on the generated metric, and render the digital map with representations of the elements of the common type rendered in accordance with the determined set of visual attributes.

11. The computing device of claim 10, wherein:
the plurality of elements are search results ordered according to relevance,
the several elements of the common type correspond to top N of the search results, and the representations of the elements are location makers displayed at respective locations on the digital map.

12. The computing device of claim 10, wherein the plurality of elements represent paths of two or more types.

13. The computing device of claim 10, wherein the plurality of elements represent geographic features including at least one building, and wherein the several elements of the common type represent paths.

14. The computing device of claim 10, wherein the map data includes a description of a set of default visual attributes for the several elements of the common type, wherein the default visual attributes are different from the generated visual attributes for the elements of the common type.

15. The computing device of claim 14, further comprising:
a network interface to receive the map data from a network server via a communication network.

16. The computing device of claim 10, wherein the one or more visual attributes include at least one of color and line thickness.

17. A method in a computing device for generating interactive digital maps, the method comprising:
receiving, by one or more processors, a description of a plurality of elements representing physical and/or logical entities in a geographic area, wherein a representation of each of the plurality of elements is to be displayed in a respective position on a digital map;
displaying a first portion of the digital map within a first viewport;
displaying representations of a first subset of the elements within the first viewport, including selecting one or more visual attributes for the first subset in view of a size of the first subset;
displaying a second portion of the digital map within a second viewport;
displaying representations a second subset of the elements within a second viewport, including applying one or more different visual attributes for the second subset in view of a size of the second subset, wherein the first subset and the second subset partially overlap.

18. The method of claim 17, wherein the plurality of elements represent search results ordered according to relevance, and wherein the representations of the elements are geographic markers.

19. The method of claim 18, wherein plurality of elements represent paths of two or more types.

20. The method of claim 18, wherein the visual attributes includes at least one of color and line thickness.

* * * * *